Patented Dec. 26, 1922.

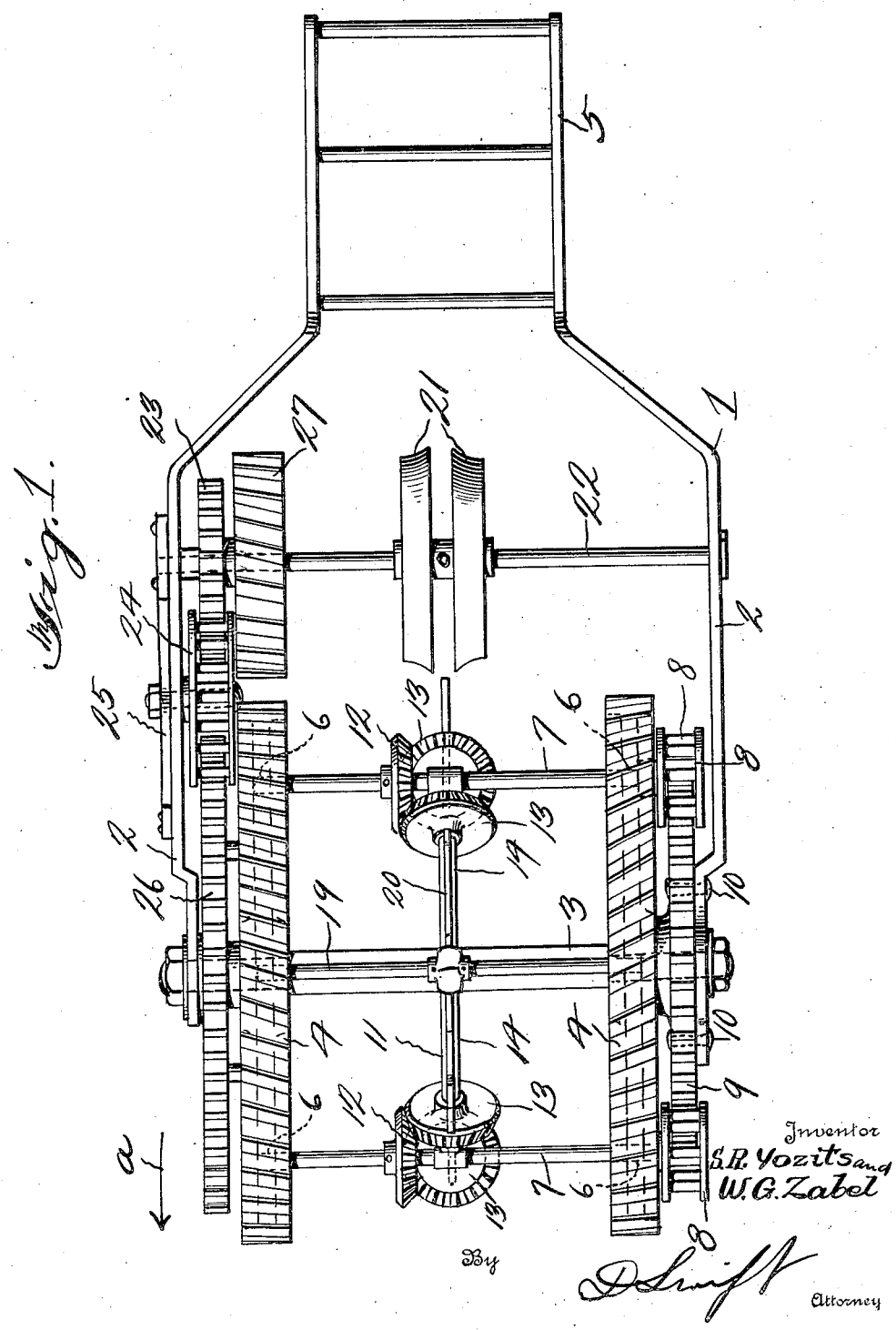

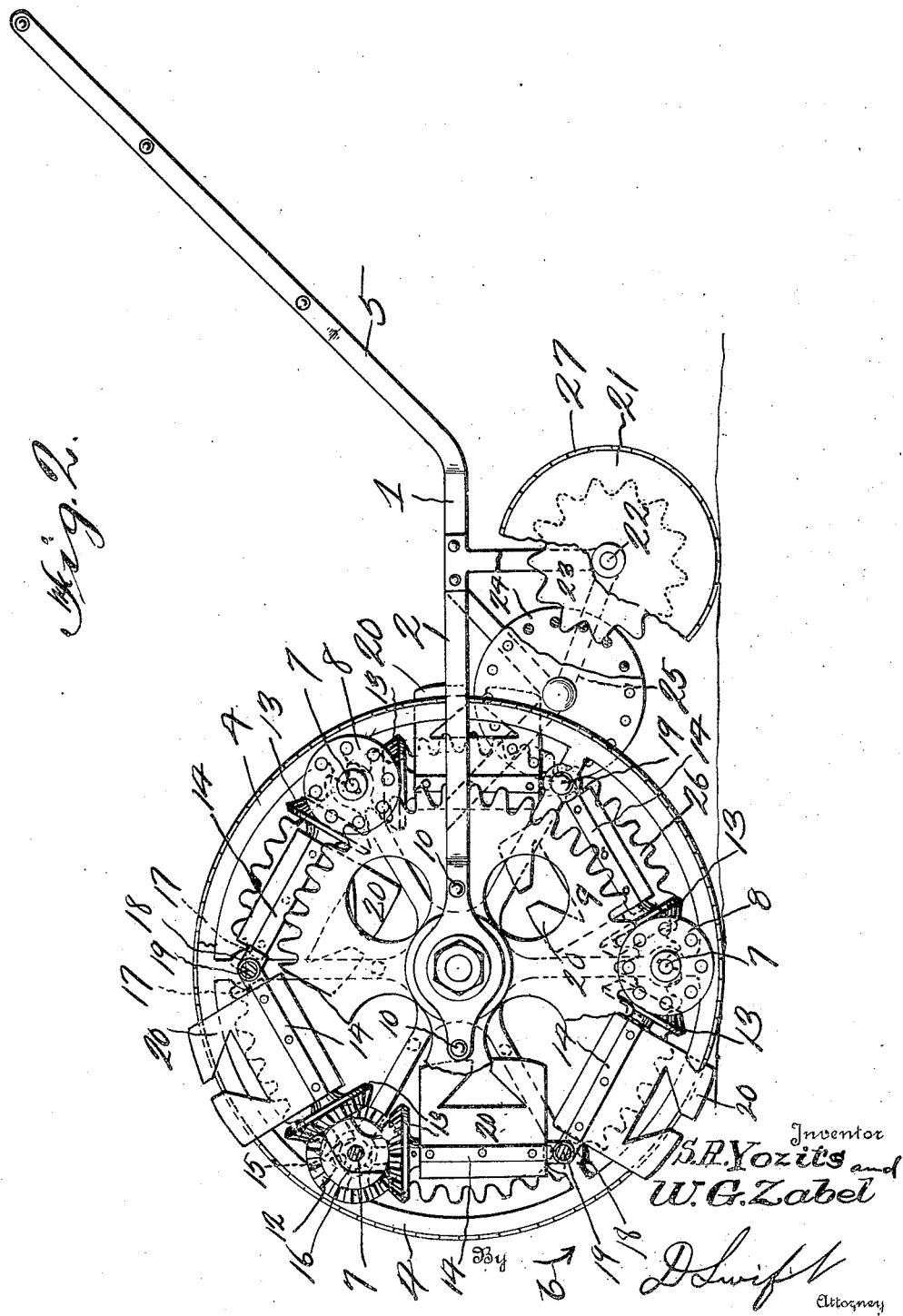

1,440,120

UNITED STATES PATENT OFFICE.

STEVE R. YOZITS AND WILLIAM G. ZABEL, OF OSHKOSH, WISCONSIN.

BEET BLOCKING AND THINNING MACHINE.

Application filed January 17, 1922. Serial No. 529,946.

*To all whom it may concern:*

Be it known that we, STEVE R. YOZITS and WILLIAM G. ZABEL, citizens of the United States, residing at Oshkosh, in the county of Winnebago, State of Wisconsin, have invented a new and useful Beet Blocking and Thinning Machine; and we do hereby declare the following to be a full, clear, and exact description of the invention, such as will enable others skilled in the art to which it appertains to make and use the same.

The invention relates to beet blocking and thinning machines, and has for its object to provide a device of this character comprising a frame, ground engaging wheels rotatably mounted within the frame, said wheels being connected by rotatable shafts rotatably mounted in the wheels and spaced from the center of the wheels, which shafts are rotated by gears carried thereby and meshing with a gear carried by the frame adjacent one side of the wheel. Also to provide angularly disposed shafts having gear connections with the shafts driven by the ground engaging wheels, said angularly disposed shafts being provided with cutting elements which are rotated therewith.

A further object is to provide spaced blocking wheels carried by a rotatable shaft, which blocking wheels are driven through gear connections between the shaft and a gear driven by one of the ground engaging wheels.

A further object is to provide a beet thinning and blocking machine having thinning and blocking mechanism actuated from ground engaging wheels through gear connections.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the machine.

Figure 2 is a side elevation of the machine, part being broken away to better show the structure.

Referring to the drawings, the numeral 1 designates a horizontally disposed frame, and 2 forwardly extending bars thereof, which bars are in parallel relation to each other, and have rotatably mounted in bearings thereof a transversely disposed shaft 3. Rotatably mounted on a shaft 3 are ground engaging wheels 4, which wheels revolve when the machine is moving in the direction of the arrow $a$. The rear end of the frame 1 is provided with an upwardly extending portion 5 forming a handle member for the machine when the same is being pushed. However it is to be understood that the machine may be pulled by animals if so desired. Rotatably mounted in bearings 6 of the wheels 4 are transversely disposed shafts 7, which shafts are spaced from the centers of the wheels and rotate therewith, however during the rotation of the wheels the shafts 7 are simultaneously rotated through the medium of the pin gears 8 which mesh with the non-rotatable gear 9 secured to the arm 2 of the frame as at 10. It will be seen that as the ground engaging wheels rotate that shafts 7 will also rotate, and that angularly disposed shafts 11 will be rotated through the medium of the gears 12 carried by the shafts 7, and the gears 13 carried by the shafts 14. The shafts 14 have their gear ends rotatably mounted in bearings 15 of brackets 16 carried by the shafts 7, and their other ends rotatably mounted in bearings 17 of brackets 18 carried by transversely disposed shafts 19. As the shafts 11 rotate, the knives 20 carried thereby are also rotated as the knives move downwardly in the direction of the arrow $b$ to their lowermost position, beets will be thinned in the row by the severing of the beets, as the machine is a straddle row one, thereby thinning the beets, which is particularly essential in the case of sugar beets. In working sugar beets it is necessary to block off the row. To accomplish this result spaced discs 21 are provided, which discs are located rearwardly of the cutting mechanism and are secured on a transversely disposed rotatable shaft 22. The discs 21 are rotated at a rapid speed for blocking off and severing vegetation. To accomplish rotation of the shaft 22 from one of the ground engaging wheels 4, the shaft 22 is provided with a gear 23 which meshes with an idle pin gear 24 carried by a downwardly extending bracket 25. The idle pin gear 24 meshes with a gear 26 carried by one of the ground engaging wheels 4, therefore it will be seen that as the ground engaging wheel 4 and the gear 26 carried thereby are rotated, that the shaft 22 will be rapidly rotated through the reduced gears 23 and 24, and consequently the blocking off disc 21 carried by the shaft 22 will be rapidly rotated.

From the above it will be seen that a machine is provided which may straddle a row and thin sugar beets, said machine also being provided with means for blocking off the rows immediately following the thinning operation and that the thinning mechanism and blocking off discs are operated from the ground engaging wheels of the machine. It will also be seen that the structure is compact, the parts reduced to a minimum thereby allowing a light machine to be constructed and one which may be pushed by the operator.

A supporting wheel 27 is provided on the shaft 22, which supporting wheel may engage the ground and support the rear end of the frame. 1

The invention having been set forth what is claimed as new and useful is:

1. A thinning machine comprising a frame, ground engaging wheels carried by said frame, transversely disposed spaced shafts rotatably mounted in the wheels and rotatable therewith, a gear carried by the frame, gears carried by the shafts and meshing with the gear carried by the frame, transversely disposed bars connecting the wheels, brackets carried by said bars, knife shafts disposed between the rotatable shafts and the bars and having one of their ends rotatably mounted in bearings of the brackets carried by the bars, brackets carried by the shafts, said knife carrying shafts having their other ends mounted in bearings of the brackets carried by the rotatable shafts, gear connections between the rotatable shafts and the knife carrying shafts and knives carried by the knife carrying shaft.

2. A thinning machine comprising a frame, ground engaging wheels carried by said frame, transversely disposed shafts rotatably mounted in bearings of the ground engaging wheels and rotatable therewith, a plurality of shafts hexagonally arranged and in a vertical longitudinal plane and disposed between the wheels, means for supporting said hexagonally arranged shafts, gear connections between said hexagonally arranged shafts and transversely disposed rotatable shafts carried by the ground engaging wheels, a stationary gear carried by the frame, gear connections between the rotatable shafts and the frame carried gear, and severing elements carried by the hexagonally arranged shafts.

In testimony whereof we have signed our names to this specification in the presence of two subscribing witnesses.

STEVE R. YOZITS.
WILLIAM G. ZABEL.

Witnesses:
ANNA KNAAK,
T. A. GUNZ.